Oct. 8, 1963

J. K. MILLS 3,106,672

OUTPUT VOLTAGE CONTROL FOR POWER CONVERSION APPARATUS

Filed Sept. 29, 1961

INVENTOR
J. K. MILLS
BY
ATTORNEY

Oct. 8, 1963 J. K. MILLS 3,106,672
OUTPUT VOLTAGE CONTROL FOR POWER CONVERSION APPARATUS
Filed Sept. 29, 1961 2 Sheets-Sheet 2

INVENTOR
J. K. MILLS
BY
ATTORNEY

_United States Patent Office_

3,106,672
Patented Oct. 8, 1963

3,106,672
OUTPUT VOLTAGE CONTROL FOR POWER CONVERSION APPARATUS
John K. Mills, Morristown, N.J., assignor to Bell Telephone Laboratories, Incorporated, New York, N.Y., a corporation of New York
Filed Sept. 29, 1961, Ser. No. 141,798
5 Claims. (Cl. 320—1)

This invention relates to electrical power conversion apparatus and, more particularly, to means for adjusting the magnitude of the output voltage delivered by "transformerless" power conversion devices.

In modern electrical and electronic systems, it is often necessary to convert a direct-current voltage from an available source into a second direct-current voltage having an increased or decreased magnitude. One particularly efficient method of accomplishing such voltage conversion is to employ semiconductor devices as switches for intermittently interrupting or inverting the supply voltage in order to produce alternating-current energy. By means of known voltage multiplication and rectification techniques, it is then possible to convert the alternating-current energy delivered by the "inverter" into a second direct-current voltage. Power transformers may, of course, be used to accomplish the desired voltage multiplication. However, because of the fact that the power transformer is often a principal source of loss and acoustic noise, it is often more desirable to employ networks of diodes and capacitors to accomplish voltage multiplication. "Transformerless" power conversion apparatus employing such networks is disclosed in U.S. Patent 2,975,353 which issued to F. G. R. Rockstuhl on March 14, 1961, and in application Serial No. 141,799, entitled "Transformerless Power Conversion Apparatus," filed September 29, 1961, by Mr. J. K. Mills.

An important limitation inherent in those conversion devices which use diode-capacitor voltage multiplication networks resides in the fact that such devices are normally able to deliver only certain output voltages, namely, those voltages having magnitudes which are discrete multiples or submultiples of the input voltage. In practical applications, the inability to convert power at other voltage ratios has proven to be a significant disadvantage.

It is, therefore, a principal object of the present invention to efficiently convert an alternating-current voltage into a direct-current output voltage and to achieve this conversion at any desired ratio of supply voltage magnitude to output voltage magnitude without the use of a power transformer.

It is a further and more particular object of the present invention to provide means for adjusting the magnitude of the output voltage delivered by a "transformerless" D.C.-D.C. converter.

In a principal aspect, the present invention takes the form of an A.C.-D.C. voltage conversion device which may be suitably employed as an output arrangement for a transistorized inverter. In such an inverter, semiconductor switches are arranged for repetitiously inverting or interrupting a direct-current voltage such that an alternating-current voltage is produced at its output terminals. In accordance with a principal feature of the present invention, an autotransformer whose primary winding is connected to receive a portion of the energy from such an alternating-current voltage supply generates a second, variable A.C. voltage at its secondary terminals. During one-half cycle of the A.C. supply voltage, a diode circuit allows a capacitor to be charged to a voltage approximately equal to the peak amplitude of the instantaneous summation of the A.C. supply voltage and the variable A.C. voltage. In the following half-cycle, a second diode circuit applies the voltage existing across the capacitor to a load.

Still further objects, features and advantages of the present invention will become apparent from the following detailed description when taken with the attached drawings in which.

Figure 1:
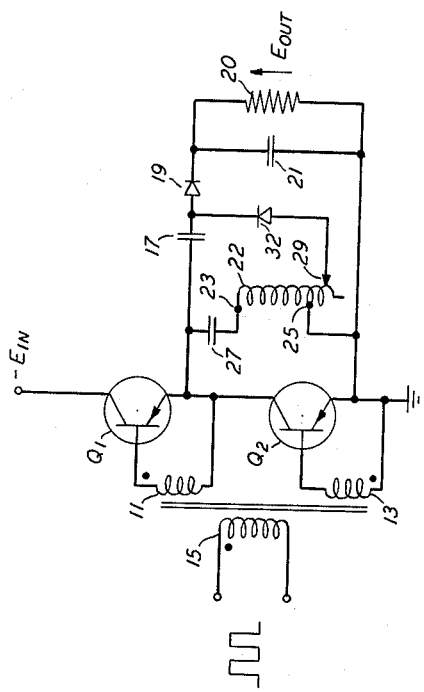
FIG. 1 illustrates a simplified conversion device capable of delivering a direct-current output voltage whose polarity is opposite that of the input voltage and whose magnitude is adjustable in accordance with the invention.

As shown in FIG. 1 of the drawings the collector-emitter paths of two transistors $Q_1$ and $Q_2$ are connected in series between ground and a negative supply voltage. The base electrode of transistor $Q_1$ is connected to its emitter electrode by means of secondary winding 11. Similarly, the base electrode of transistor $Q_2$ is connected to its emitter electrode by means of secondary winding 13. The two secondary windings 11 and 13 are coupled by mutual inductance to primary winding 15. Capacitor 17 in series with diode 19 and load resistance 20 are connected in parallel with the collector-emitter path of transistor $Q_2$. Diode 19 is poled in the direction of positive current flow away from the collector electrode of transistor $Q_2$. A filter capacitor 21 is connected in parallel with the load resistance 20. The primary winding of autotransformer 22, that is, that portion of the autotransformer between the fixed taps 23 and 25, is connected in series with a blocking capacitor 27 between the junction of transistors $Q_1$ and $Q_2$ and the grounded emitter terminal of transistor $Q_2$. The autotransformer 22 is also provided with a movable tap 29. A diode 32 which is poled in the direction of positive current flow away from the autotransformer is connected between movable tap 29 and the junction of capacitor 17 and diode 19.

The device shown in FIG. 1 of the drawings is capable of producing an output voltage whose magnitude is approximately equal to the input voltage but of inverted polarity. In operation, a "square-wave" A.C. signal is applied to primary winding 15. As shown by the dot convention, the base electrodes of transistors $Q_1$ and $Q_2$ are driven such that the two transistors are turned On and Off in phase opposition, transistor $Q_1$ being turned Off when transistor $Q_2$ is turned On and vice versa. It may be readily recognized that the junction of the two transistors is connected alternately to the negative supply voltage and ground. Transistors $Q_1$ and $Q_2$ receive sufficient base drive such that when turned Off they exhibit a high collector-to-emitter impedance and, when turned On, are driven into saturation. This saturated state is characterized in that a relatively large current may flow through the transistor's transconductive path with a very small voltage drop. In consequence, it may be accurately stated that the transistors are being used as switches and, for the purposes of understanding the operation of the invention, their switch-like action should be borne in mind.

When transistor $Q_1$ has been switched On and transistor $Q_2$ switched Off, the voltage at the junction of the two transistors is very nearly equal to the negative supply voltage. Current then flows from ground through the primary winding of the autotransformer 22 and capacitor 27 to the junction of the two transistors. Current is also allowed to flow through the secondary winding of the autotransformer 22, diode 32 and capacitor 17 to the junction of the two transistors. Since capacitor 17 on one side is directly connected by means of transistor $Q_1$ to the negative supply voltage and the other side is connected by diode 32 to the movable tap 29 of the autotransformer 22, it is charged to a voltage whose magnitude is larger or smaller than the magnitude of the negative supply voltage. This results from the fact that the current flowing from the primary winding of the autotransformer raises the potential at the movable tap 29 to a voltage whose magnitude and polarity are dependent upon the position of the movable tap 29. When the movable tap is positioned as shown in FIG. 1, capacitor 17 is charged to a voltage whose magnitude is greater than the magnitude of the supply voltage.

During the next half-cycle of operation, transistor $Q_1$ turns Off and transistor $Q_2$ conducts. Capacitor 17 is then allowed to discharge through the circuit path comprising diode 19, the parallel combination of capacitor 21 and load resistance 20, and the transconductive path of transistor $Q_2$. Since the forward impedance of diode 19 and the impedance of the conductive transistor $Q_2$ are both very small, capacitor 17 may be considered to be connected in parallel with capacitor 21 and the load resistance 20 during this half-cycle. After several cycles of operation, capacitor 21 is charged to a voltage which is approximately equal to the voltage to which capacitor 17 was originally charged.

By adjusting the position of the movable tap 29, it is possible to compensate for the various voltage drops inherent of the circuit to produce an output voltage whose magnitude is substantially identical to the magnitude of the supply voltage. If desired, the magnitude of the output voltage may be raised to a value in excess of the magnitude of the supply voltage by moving the tap 29 to a position even farther beyond the fixed tap 25. Likewise, the magnitude of the output voltage may be decreased by moving the movable tap 29 toward fixed tap 23. In accordance with a feature of the invention it is important to recognize that the autotransformer delivers only a portion of the output power to the load and, consequently, may be quite small in comparison to the size of a power transformer which would deliver the output power in its entirety. Because of the small size of the autotransformer, the advantages inherent in a "transformerless" circuit are to a large extent retained.

The principles of the invention are, of course, equally applicable to forms of inverter circuitry other than the arrangement shown in FIG. 1. More particularly, the invention may be employed to advantage in conjunction with inverters of the type shown in FIGS. 2 through 4 of the drawings. In each of the figures, like numerals designate those elements common to each of the several embodiments.

Figure 2:
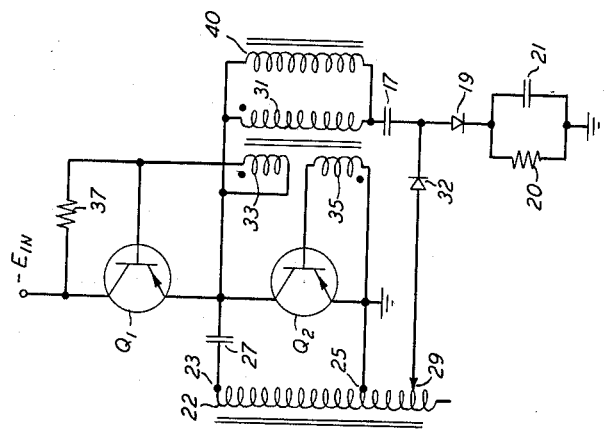
FIG. 2 illustrates a preferred polarity reversing converter having an output voltage whose magnitude is adjustable in accordance with the invention.

The inverter arrangement shown in FIG. 2 employs a shunt inductor current feedback arrangement for switching transistors $Q_1$ and $Q_2$ On and Off in alternation. The feedback arrangement comprises a feedback transformer whose primary winding 31 is connected between capacitor 17 and the collector electrode of transistor $Q_2$. The feedback transformer is provided with two secondary windings 33 and 35 which are arranged such that the base electrodes of transistors $Q_1$ and $Q_2$ are driven in phase opposition. A starting resistance 37 is connected between the collector electrode and base electrode of transistor $Q_1$. A separate inductor 40 is connected in parallel with primary winding 31 of the feedback transformer.

In order to place the device in operation, a negative supply voltage is applied to the collector electrode of transistor $Q_1$. Starting resistance 37 applies a negative forward biasing potential to the base electrode of transistor $Q_1$ causing it to conduct. Current initially flows from the grounded emitter electrode of transistor $Q_1$ through the secondary winding of autotransformer 22, diode 32, capacitor 17 and the parallel combination of the primary winding 31 of the feedback transformer and the shunt inductor 40 to the emitter of transistor $Q_1$. Since the impedance of the primary winding of the feedback transformer is merely the reflected base-to-emitter impedances of the two transistors and, consequently, quite small in comparison to the inductive reactance represented by inductance 40, nearly all of the current initially flows through the primary winding. This current induces voltages in the secondary windings which turn Off transistor $Q_2$ and drive transistor $Q_1$ even further into conduction. The current through transistor $Q_1$ rises very rapidly and the transistor $Q_1$ "saturates"; i.e., it is now characterized by having very small voltage drop substantially independent of the magnitude of current flowing through it. The voltage drop across the primary winding 31 is also very small due to its small impedance; consequently, the magnitude of current flow is determined primarily by the impedance of capacitor 17 and the secondary winding of autotransformer 22. Since the RC time constant of this circuit is quite large relative to the switching times being considered here, the current may be considered to be substantially constant. The shunt inductor 40 is characterized by having a much smaller resistance yet a much larger inductance than that looking into primary winding 31. Initially, therefore, the current applied to the parallel combination of the primary winding 31 and inductance 40 will for the most part flow through the primary winding. As current continues to flow however, the inductor 40 will shunt in increasing portion of the current around the primary winding 31. Since the primary winding is being "starved" of current, it now begins to decrease the forward bias applied to the base electrode of transistor $Q_1$, eventually bringing it out of saturation. The current flowing through transistor $Q_1$ remains nearly constane until transistor $Q_1$ comes out of saturation and begins to exhibit a voltage drop. As the voltage drop across $Q_1$ increases the current flowing through the parallel combination of the primary winding and the shunt inductor decreases. The current cannot decrease instantaneously in the shunt inductor, however, so that the inductor induces a "circulating current" through the primary winding 31 in the opposite direction of the original current flow. This circulating current immediately cuts Off transistor $Q_1$—and it does this very rapidly since $Q_1$ was already brought out of saturation—and turns On transistor $Q_2$.

It is important to note that during the time transistor $Q_1$ was On, current was flowing from the grounded emitter terminal of transistor $Q_2$ through the primary winding of the autotransformer 22 and blocking capacitor 27 to the emitter electrode transistor $Q_1$. This current induced the voltage in the secondary winding of the autotransformer which raised the potential at the movable tap 29 to a finite voltage positive with respect to ground. At that time, the capacitor 17 then was connected on one side to the positive tap 29 by means of diode 32 and on the other side to the negative supply voltage through the lower impedance primary winding and the collector-emitter path of transistor $Q_1$, thereby charging it to a voltage in excess of the magnitude of the negative supply voltage.

When transistor $Q_2$ was turned On, the upper end of capacitor 17 is substantially connected to ground thereby raising the potential at the juncture of diodes 19 and 32 to a positive potential having a magnitude equal to the magnitude of the voltage to which capacitor 17 was originally charged. As before, this voltage is applied to the load resistance 20 and filter capacitance 21 by means of diode 19.

Figure 3:
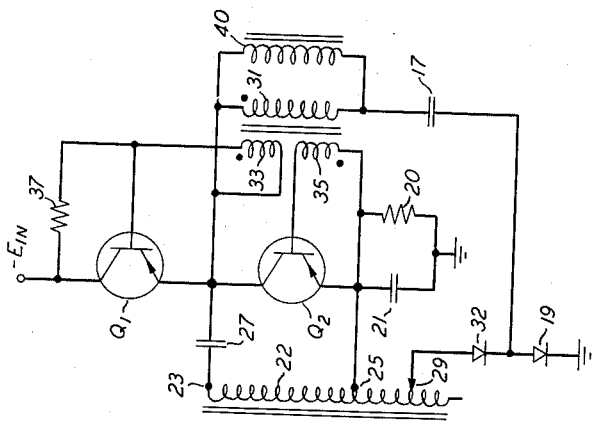
FIG. 3 illustrates an active voltage divider circuit which employs the invention to provide an adjustable output voltage.

The arrangement shown in FIG. 3 of the drawings illustrates the application of the principles of the invention to an "active voltage divider" capable of delivering an output voltage having a magnitude which is a fractional part of the input voltage magnitude and having the same polarity. In accordance with the present invention, an autotransformer in combination with diode isolation circuitry is used to provide means for adjusting the magnitude of the output voltage.

As shown in FIG. 3, load resistance 20 and capacitor 21 are connected between the emitter electrode of transistor $Q_2$ and ground. Capacitor 17 is connected between secondary winding 31 of the feedback transformer and the junction of diodes 32 and 19, diode 32 being connected to the movable tap 29 and diode 19 being connected to ground.

The "active voltage divider" employs the shunt inductor feedback network discussed in conjunction with FIG. 2 of the drawings. The manner in which transistor switching is accomplished is substantially identical to the operation of the arrangement of FIG. 2 and, therefore, a discussion of the switching operation will not be repeated here.

In FIG. 3, when transistor $Q_1$ is On, current flows from ground, through the parallel combination of load resistance 20 and filter capacitor 21, through the secondary winding of autotransformer 22, diode 32, capacitor 17, the feedback network, and finally through the emitter-collector path of transistor $Q_1$ to the negative input terminal. At the same time, a current flows in the primary winding of autotransformer 22 which induces a voltage at the movable tap 29 which is positive with respect to the potential at tap 25. Since the voltage drops across transistor $Q_1$, feedback winding 31, and diode 32 are small compared to the voltages across capacitors 17 and 21, and since the voltage induced between taps 25 and 29 of the autotransformer tends to reinforce the negative supply voltage, the sum of the voltages across capacitors 17 and 21 will be approximately equal to the sum of the supply voltage and the induced voltage. The potential across either one of the two capacitors will, of course, depend upon the ratio of capacitance between the two and upon the resistance of load 20. For purposes of illustration, the voltage drops across capacitors 17 and 21 hereafter will be taken to be equal.

After transistor $Q_1$ has been On for a predetermined length of time, the feedback network will turn that transistor Off and turn transistor $Q_2$ On. Transistor $Q_2$, being conductive, along with the primary winding 31 of the feedback transformer connects the more negative terminals of the two capacitors 21 and 17 together while the forward biased diode 19 effectively grounds the more positive terminal of capacitor 17 thereby placing it in parallel with capacitor 21. The load resistance 20, therefore, has at least one charged capacitor in parallel with it at all times and consequently receives a negative direct-current voltage which is equal to approximately one-half of the sum of the supply voltage and the voltage induced between windings 25 and 29 of the autotransformer.

By adjusting the position of the movable tap 29, the voltage delivered to the load 20 may be set to be equal to precisely half the supply voltage. This condition would be achieved when the voltage increase delivered by the autotransformer is equivalent to the voltage drops across $Q_1$, the primary winding 31, diode 32 and other unavoidable voltage drops. In this manner, the invention provides a method of achieving accurate voltage division by compensating for those losses inherent in the circuit.

Figure 4:
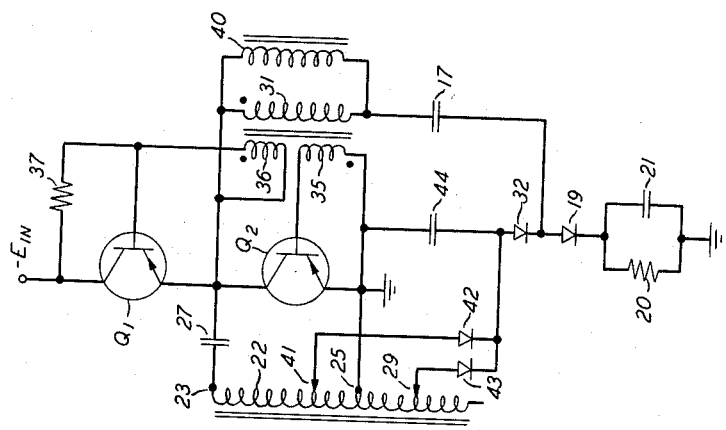
FIG. 4 illustrates a polarity reversing converter which employs an additional tap on the autotransformer in accordance with the invention to provide a full-wave "boost" voltage.

The arrangement shown in FIG. 4 of the drawings employs an autotransformer provided with two movable taps 29 and 41, instead of the single tap 29 used in the other embodiments, along with two additional diodes 42 and 43, and an added capacitor 44. This circuitry provides a full-wave "boost" voltage. The remainder of the circuit is identical to that shown in FIG. 2 of the drawings.

In operation, the transistors are switched On and Off in alternation by the action of the shunt inductor feedback network. When transistor $Q_1$ conducts, the capacitor 17 is effectively connected on one side of the negative supply voltage and on the other side is connected by means of diode 32 to the positive voltage across capacitor 44. This positive voltage across capacitor 44 is maintained regardless of which transistor is turned On since one of the taps 29 or 41 is positive with respect to ground when current flows in either direction through the autotransformer. The diodes 42 and 43 prevent capacitor 44 discharging through that tap which is more negative.

When transistor $Q_2$ conducts, capacitor 17 applies a positive voltage to the load circuit composed of resistance 20 and filter capacitor 21. Diode 32 prevents capacitor 17 from discharging to the less positive capacitor 44. After a period operation, the voltage delivered to the load will be approximately equal to the sum of the supply voltage and the voltage across capacitor 44. As before, it is noteworthy that the autotransformer delivers only a portion of the total power to the load and, consequently, may be quite small with respect to a power transformer of the type required to deliver the entire power to the load.

The embodiments described above do not, of course, represent all of the possible applications of the invention. Numerous other arrangements might be devised by those skilled in the art without departing from the true spirit of the invention, the scope of which is defined in the appended claims.

What is claimed is:

1. In combination, a source of unidirectional voltage having first and second output terminals, switching means for effectively connecting a third terminal to said first and second terminals in alternation, a transformer having a primary winding and a secondary winding coupled by mutual inductance, circuit means for connecting said primary winding between said first and said third terminals, a capacitor, first diode means for serially connecting said capacitor and said secondary winding between said first and said third terminals, said first diode means being poled such that when said third terminal is connected to said second terminal, said capacitor is charged by a current flowing through said secondary winding, a load circuit, and second diode means for effectively connecting said load circuit in parallel with said capacitor when said third terminal is connected to said first terminal, said second diode means being poled such that current is allowed to flow through said load circuit to discharge said capacitor.

2. A combination as set forth in claim 1 including an inductive winding having first and second fixed connections and a movable tap, the portion of said winding between said fixed connections constituting said primary winding and the portion between said first fixed connection and said movable tap constituting said secondary winding.

3. A combination as set forth in claim 1 including a blocking capacitor serially connected with said primary winding.

4. A combination as set forth in claim 2 including a blocking capacitor serially connected with said primary winding.

5. In combination, a two-terminal source of a direct-current potential, a pair of controllable switches each having a control electrode and a transconductive path, circuit means for connecting the transconductive paths of said switches in series across said source, means connected to the control electrodes of said switches for turning said switches On and Off in phase opposition, an autotransformer having first and second fixed connections and a movable tap, a blocking capacitor connected between said first fixed connection and the junction of said transconductive paths, circuit means for connecting said second fixed connection to one terminal of said source, a second capacitor and a load connected in series with each other and in parallel with a selected one of said switches, a diode connected between said movable tap and the junction of said second capacitor and said load, said diode being poled such that when said selected switch is turned off said second capacitor is allowed to charge to a potential whose magnitude is the sum of the direct-current source potential and the potential existing between said movable tap and said second fixed connection on said autotransformer.

References Cited in the file of this patent

UNITED STATES PATENTS

| | | |
|---|---|---|
| 2,588,777 | Thompson | Mar. 11, 1952 |
| 2,843,796 | Schade | July 15, 1958 |
| 2,956,183 | Culbertson | Oct. 11, 1960 |
| 2,975,353 | Rockstuhl | Mar. 14, 1961 |